United States Patent [19]

Meiners

[11] 4,030,753
[45] June 21, 1977

[54] DUAL WHEEL CONSTRUCTION

[75] Inventor: Elmo R. Meiners, Anchor, Ill.

[73] Assignee: M & W Gear Company, Gibson City, Ill.

[22] Filed: May 2, 1975

[21] Appl. No.: 573,983

[52] U.S. Cl. .......................... 301/36 R
[51] Int. Cl.² ...................... B60B 11/00
[58] Field of Search ............ 301/36 R, 39 R, 38 R, 301/38 S, 36 WP, 39 C, 13 SM

[56] References Cited

UNITED STATES PATENTS

| | | | |
|---|---|---|---|
| 1,294,887 | 2/1919 | Evans | 301/39 R |
| 1,827,792 | 10/1931 | Keller | 301/13 SM |
| 1,948,136 | 2/1934 | Scheckler | 301/36 R |
| 2,414,156 | 1/1947 | Matthanar | 301/36 R |
| 2,826,457 | 3/1958 | Sinclair | 301/36 R |
| 3,583,767 | 6/1971 | Unverferth et al. | 301/39 R |
| 3,736,029 | 5/1973 | Dietrich | 301/39 R |
| 3,893,689 | 7/1975 | Vethoff | 301/39 R |

FOREIGN PATENTS OR APPLICATIONS 435,086  9/1935  United Kingdom ............ 301/38 R Primary Examiner—Drayton E. Hoffman
Assistant Examiner—H. Grant Skaggs
Attorney, Agent, or Firm—Allegretti, Newitt, Witcoff & McAndrews

[57] ABSTRACT

An improved dual wheel construction includes a first inside rim and a second outside rim. The inside rim includes a typical hub plate construction for attachment of the rim to the axle of a vehicle such as a tractor. The outside rim includes a plurality of circumferentially spaced plates projecting laterally, outwardly from the side of the outside rim. A closed circular ring member interconnects the plates. A plurality of openings are defined in the ring. Fastening bolts and nuts connect the hub plate of the inside rim to the ring member associated with outside rim and maintain the plate members in tight, locking communication with the inside rim.

7 Claims, 3 Drawing Figures

DUAL WHEEL CONSTRUCTION

BACKGROUND OF THE INVENTION

This invention relates to a dual wheel construction for vehicles and more particularly to an improved dual wheel construction of the type including means for removably attaching the outside rim.

Dual wheel configurations for various land vehicles are known in the art. Dual wheel arrangements are popular for farming operations, particularly where the soil is wet or boggy. Generally, the inside rim of a dual wheel construction is attached by means of a hub plate assembly to the axle of the vehicle. The outside rim and attached wheel are then fastened to the inside rim.

In the past, numerous dual wheel assemblies have been suggested. Typical of the prior art structures is that shown in U.S. Pat. No. 3,583,767. One characteristic common to many prior art constructions is the structure utilized to attach the separate rims. A closed, cylindrical hoop is often utilized to space the rims an appropriate distance. The region defined by this cylindrical hoop and the tires of the dual wheels defines a pocket in which material may become clogged. Thus, mud or clay in the field may clog the region between the dual wheels and become packed therein thereby lowering the efficiency of the vehicle. For example, extra weight must be transported by the vehicle.

The present invention offers a solution to this particular problem and, in addition, provides a dual wheel construction which is easily manufactured and assembled.

SUMMARY OF THE INVENTION

In a principal aspect, the present invention comprises a dual wheel construction including first and second separate rims. One of the rims includes a plurality of laterally projecting plates arranged around the circumference of the rim and interconnected by a circular ring member. Fastening means connect the ring member to a hub plate associated with the first rim and maintain the plates tightly against the first rim. The plates thus serve to bridge the gap between the dual wheels and maintain the distance of separation between rims. Additionally, since the plates are spaced or separated circumferentially about the rims, mud and other material does not tend to less clog the region between rims of the dual wheel assembly.

Thus, it is an object of the present invention to provide improved dual wheel construction.

It is a further object of the present invention to provide a dual wheel construction including a plurality of laterally projecting, circumferentially spaced plates associated with one of the rims of the dual wheel construction, a cylindrical ring, means for interconnecting the plates and additional means for connecting the ring means to the other rim member.

Another object of the present invention is to provide a unique dual wheel construction wherein one of the wheels is easily detached from the other.

These and other objects, advantages and features of the invention will be set forth in detail in the description which follows.

BRIEF DESCRIPTION OF THE DRAWING

In the detailed description which follows, reference will be made to the drawing comprised of the following figures.

DESCRIPTION OF THE PREFERRED EMBODIMENT

As shown in the figures, the dual wheel construction of the invention includes an inside rim 10 and an attached, spaced outside rim 12. The construction and structure of the inside rim and attached components is typical and is generally known in the art. That is, the inside rim 10 includes depending outside flanges 14 and 16 which cooperate with an appropriate wheel or tire (not shown). Circumferential ridges as at 18 and 20 are defined on the inside of the rim 10 and cooperate with a hub plate assembly 22.

Figure 1:
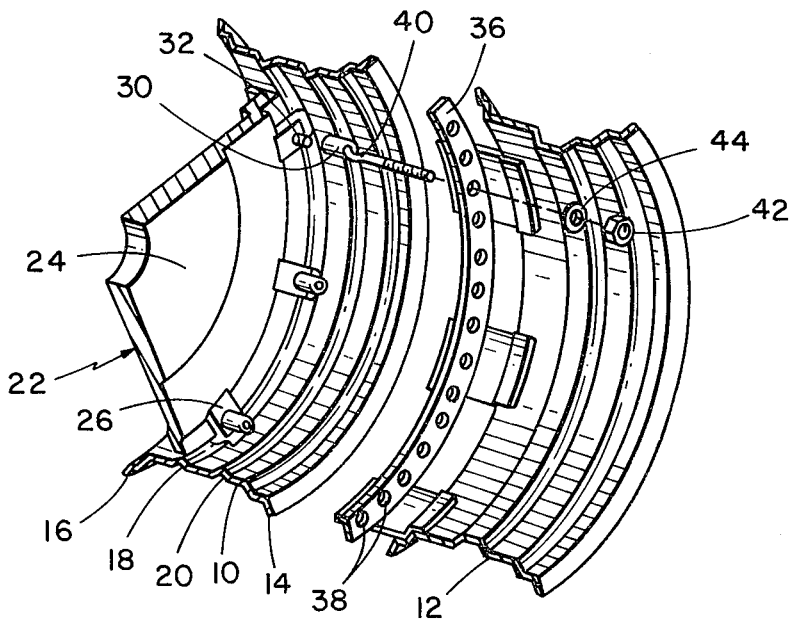
FIG. 1 is an exploded, partial perspective view of a typical inside rim and hub in combination with an outside rim to form the dual wheel assembly of the present invention.
Figure 2:
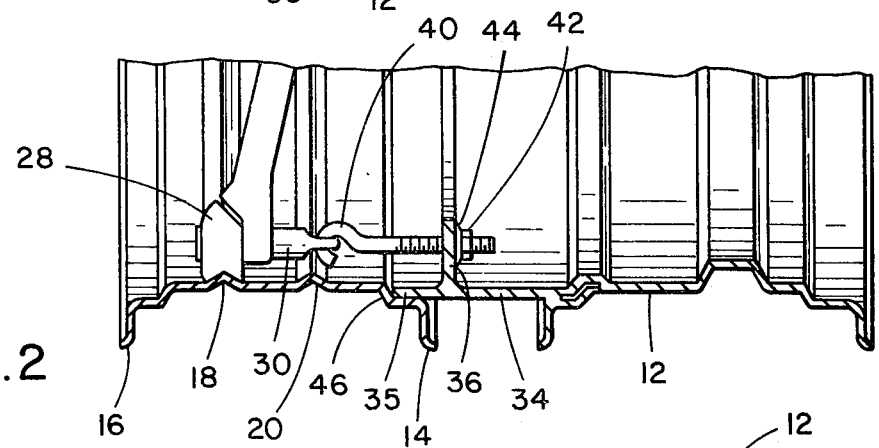
FIG. 2 is a cross-sectional view of mechanism for attaching the inside and outside rims of a dual wheel assembly.
Figure 3:
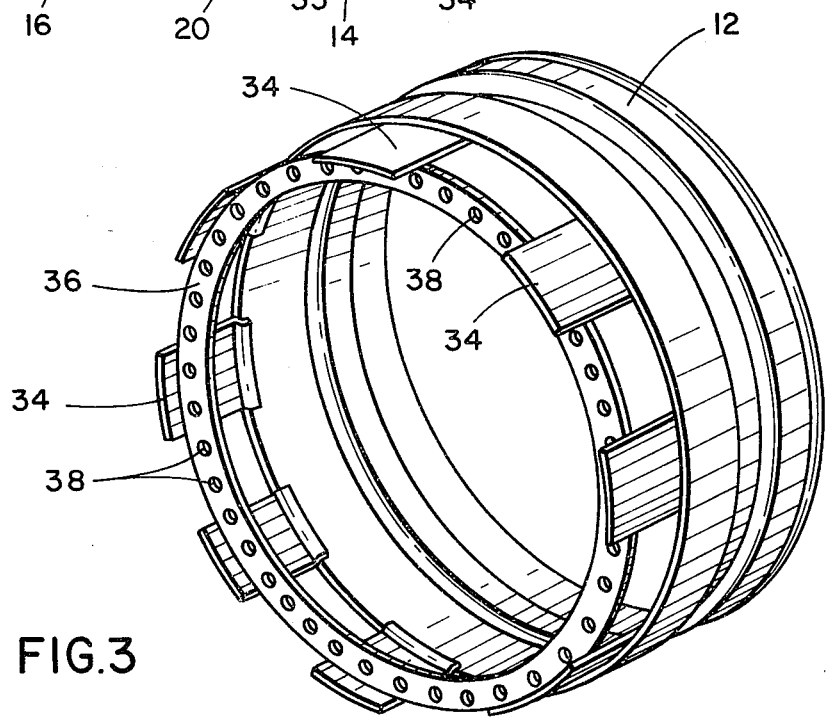
FIG. 3 is a perspective view of the outside rim of the dual wheel construction of the present invention.

FIGS. 1 and 2 illustrate separate types of hub plate assemblies 22. In each instance, however, the assembly 22 includes a hub plate 24 which may be attached to an axle (not shown) of a vehicle such as a tractor. The hub plate 24 cooperates with ridge gripping members as at 26 in FIGS. 1 and 28 in FIG. 2. The hub plate 24 in cooperation with ridge gripping member 26, 28 is maintained in cooperation with ridge 18 by means of a bolt 32 and nut fastener. In the dual wheel construction illustrated, however, the nut has been replaced by an eye 30 cooperative with bolt 32 which together with gripping members 26, 28 provides fastening means for attaching hub plate 24 to rim 10.

The outside rim 12 likewise includes various ridges and flanges for cooperation with a wheel or tire. Additionally, a plurality of circumferentially arranged, spacer plates 34 are welded to the outside rim 12 and project laterally therefrom so that they lie on the surface of an imaginary cylinder having the same rotation axis as that of the outside rim 12. The plates 34 are preferably spaced equidistant intervals about the circumference of the rim 12. The space between the plates 34 is preferably one to one and one-half times the width or circumferential dimension of each plate. Each plate 34 includes an outside projecting edge 35. The edges 35 define a substantially common plane perpendicular to the axis of revolution of the rim 12.

The plates 34 are interconnected by a continuous circular ring member 36 on the inside of the cylinder defined by the plates 34. Ring member 36 is welded to each of the plates 34 and is perpendicular therewith as illustrated most clearly in FIG. 2. Preferably, the ring member 36 is positioned almost even with the edge 35 of plate 34 so that the edge 35 will not tend to turn inward as the assembly is tightened. Ring member 36 includes a plurality of equally spaced openings 38. In the preferred embodiment, there are approximately three openings across the width of a plate 34.

Openings 38 cooperate with a threaded hook 40. Hook 40 engages the eye 30 at one end and is inserted through an opening 38 at the opposite end. Nut 42 and lock washer 44 are attached to the threaded end of hook 40. Together hook 40, eye 30, nut 42 and washer 44 comprise means for connecting ring member 36 to the fastening means of rim 10. Note that the hook 40 is projected through that opening 38 which is most nearly aligned with a straight line extension of bolt 32. Preferably, the hook 40 will be positioned through an opening 30 directly over one of the plates 34 rather than an opening intermediate adjacent plates 34. The bolts 42 are made tight so that the ends 35 of plates 34 tightly engage and abut a circular flange portion 46 of the inside rim 10.

With the construction of the present invention it is possible for dirt and other material to flow between adjacent plates 34 rather than clog the region between dual wheels affixed to rims 10 and 12. Additionally, the structure of the ring member 36 in combination with the plates 34 provides an easily assembled dual wheel construction. Therefore, while in the foregoing there has been set forth a preferred embodiment of the present invention, it is to be understood that alternative constructions are possible. As a result, the invention should be limited only by the following claims and their equivalents.

What is claimed is:
1. An improved dual wheel construction for vehicles comprising, in combination:
 a first hub assembly having a hub plate for attachment to an axle of the vehicle and a generally cylindrical rim mounted on the hub, said rim including a circular side flange;
 a second separate generally cylindrical rim including one side in opposed relation with the side flange of the first rim;
 a plurality of separate, projecting spacer plates attached to and extending laterally from the one side of the second rim, each plate having an unattached end coincident generally with a circle having the axis of said second rim, said second rim also including a closed, circular ring member connected along one edge to the plates; and
 means for connecting and fastening the ring member with the hub assembly of the first rim to thereby hold the unattached ends of the plates against the circular side flange of said first rim.

2. In a dual wheel construction of the type including first and second separate rims, one of the rims including a hub assembly for attachment to an axle, said hub assembly including a plurality of fastening means for attaching a hub plate to the one rim, the improvement comprising, in combination:
 a plurality of separate, circumferentially arranged plates fixed to the other rim and projecting laterally therefrom toward the one rim, said plates being spaced about the circumference of the other rim and having unattached projecting ends;
 a closed circular ring member having one edge connected with all of the plates; and
 means for connecting the ring member with the fastening means and simultaneously maintain the projecting ends of the plate in contact with the one rim.

3. The improved dual wheel construction of claim 2 wherein said ring member comprises a plate member extending perpendicular from said plates and generally perpendicular to the axis of rotation of said rim.

4. The improved dual wheel construction of claim 2 wherein said ring member includes a plurality of uniform, spaced openings for cooperation with the fastening means.

5. The improved construction of claim 2 wherein said means for connecting and said fastening means comprise a combination eye and hook attached to the hub plate and said one rim at one end and attached to the ring member at the opposite end.

6. The improved construction of claim 2 wherein the ring member is positioned on the inside of the cylinder defined by the spacer plates.

7. The improved constructional claim 2 wherein said plates are spaced a distance equal to or greater than the circumferential width of said plates whereby dirt does not clog the space between separated dual wheels and a connecting rim.

* * * * *